Patented Apr. 4, 1950

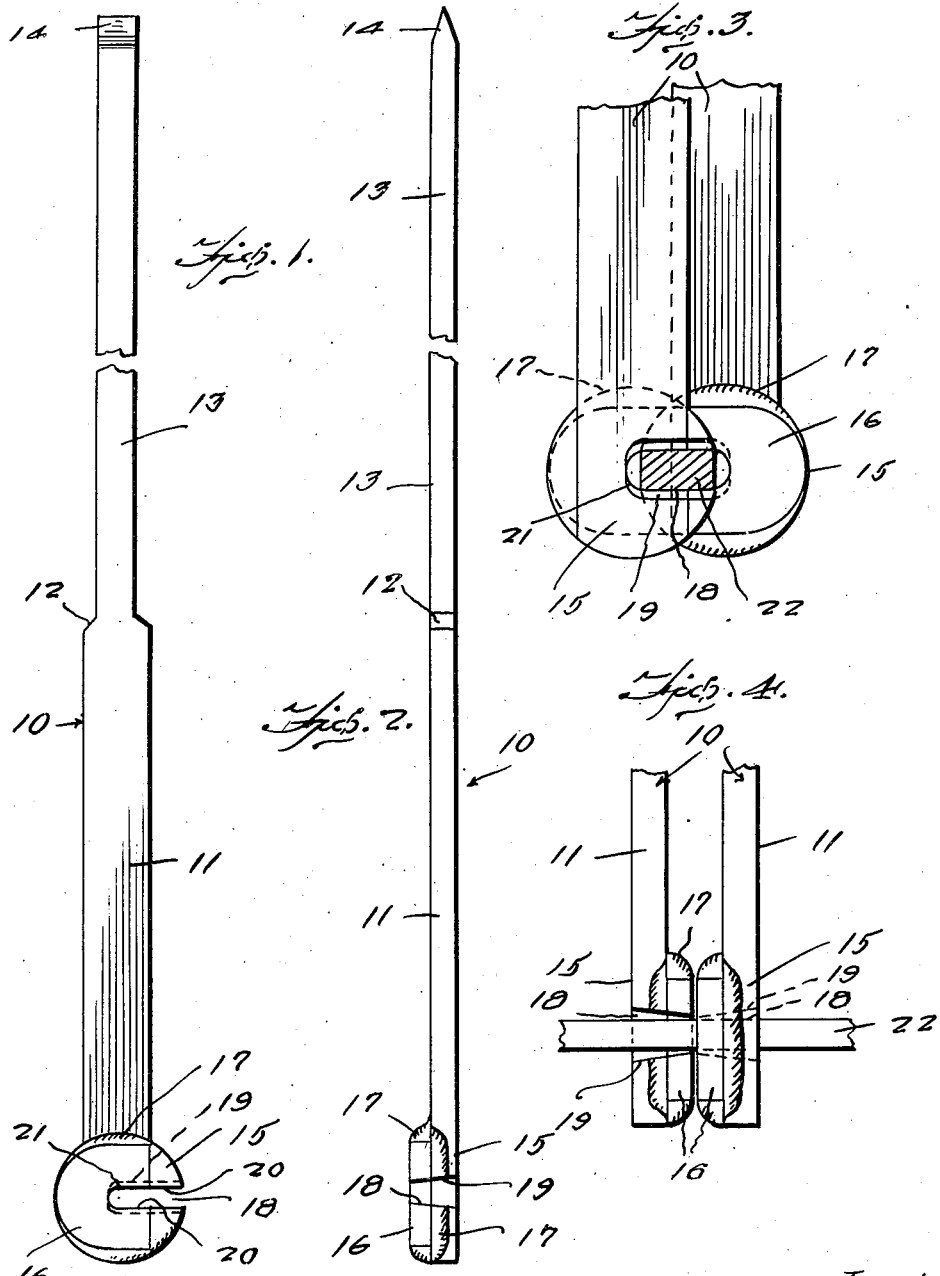

2,502,582

UNITED STATES PATENT OFFICE 2,502,582

CUTTING TOOL

Gene W. Murphy and Samuel I. Kelley,
St. Lawrence, S. Dak.

Application March 22, 1946, Serial No. 656,455

1 Claim. (Cl. 30—194)

This invention relates to a cutting tool, and more particularly to such a device adapted to cut bar stock, such as iron, mild steel, or similar material.

A primary object of this invention is the provision of an improved cutting device comprised of a pair of oppositely positioned, substantially identical members adapted to cut bar stock by a torsional movement of the two opposed members.

An additional object of the invention is the provision of such a device which may be readily utilized by a single individual, in order to cut such stock efficiently and rapidly.

A still further object of the invention is the provision of a device which may be readily utilized in constricted spaces and in locations which present difficulty to the insertion of more cumbersome cutting tools.

Still another object of the invention is the provision of such a device which is sturdy and durable in construction, reliable and efficient in operation, and relatively simple and inexpensive to manufacture, assemble, and utilize.

Other objects will in part be obvious and in part be pointed out as the description of the invention proceeds, and shown in the accompanying drawings, wherein there is disclosed a preferred embodiment of this inventive concept.

In the drawings:

Figure 1 is a front plan view of one of the elements comprising a feature of the instant invention, partially broken away.

Figure 2 is a view taken substantially at right angles to Figure 1.

Figure 3 is an enlarged fragmentary view showing two of the members comprising the cutting device in cutting association with a bar of stock, as viewed from the front, or end of the stock.

Figure 4 is a view taken substantially at right angles to Figure 3, certain concealed portions of the apparatus being indicated in dotted lines.

Similar reference characters refer to similar parts throughout the several views of the drawings.

Having reference now to the drawings, the cutting device of the instant invention comprises a pair of substantially identical members, one of which is indicated at 10 in Figures 1 and 2. Each of the members 10 includes a shank portion 11 having beveled shoulder portions 12 merging into an extending handle or shaft 13, which may, if desired, terminate in a chisel point 14. The lower extremity of each member 10 is formed to provide a disc portion 15 and has affixed thereto a disc-like cutting member 16 comprised of high carbon steel. The shank may, if desired, be comprised of mild steel or the like. The member 16 is secured to the shank 10, as by welding 17, or the like. A slot 18 is cut or formed in the disc portion 15 and the member 16 and diverges from the cutting member 16 towards the portion 15 of the shank and therethrough, as indicated at 19, to form a pair of opposed cutting edges 20. The rear surface of each of slots 18 is filleted, as at 21, to form round corners.

In the use and operation of the device, the two members 10 are positioned, as best shown in Figures 3 and 4, with the cutting members 16 in face-to-face abutting relation with the stock 22 to be cut received in each of the slots 18. The slots are oppositely disposed and the shanks 13 extend radially in face-to-face but slightly spaced relation. If the shanks 13 are now forced in opposite directions, a torsional movement is imparted to the cutting edges 20 formed by the slots 18 in the high carbon steel members 16, the inner edges of which cut the steel, starting at the four opposed corners thereof, and extending inwardly as the torque increases, until the bar stock 22 is snapped at the substantial center of the cut.

Obviously, the slots 18 may be made in any desired size to accommodate any desired size of stock, and a variety of sizes of stock may be accommodated in a single sized slot.

From the foregoing it will now be seen that there is herein provided an improved cutting device which accomplishes all the objects of this invention, and others, including many advantages of great practical utility and commercial importance.

As many embodiments may be made of this inventive concept, and as many modifications may be made in the embodiment hereinbefore shown and set forth, it is to be understood that all matter herein is to be interpreted merely as illustrative, and not in a limiting sense.

We claim:

In a cutting device, a pair of shank members, each of said shank members having an extremity formed with a slot therein, a high carbon steel disc rigidly secured to each extremity, each disc being formed with a cutting slot therein aligned with said first-mentioned slot, said discs being adapted to be positioned oppositely about a bar of stock to be cut with said discs in face-to-face abutting relation and with said slots oppositely disposed and receiving said stock therein, and said members being adapted to be rotated in opposite directions to shear said bar, and said discs providing arcuate edges engageable with a supporting surface and providing fulcrums.

GENE W. MURPHY.
SAMUEL I. KELLEY.

REFERENCES CITED

The following references are of record in the file of this patent:

UNITED STATES PATENTS

| Number | Name | Date |
|---|---|---|
| 146,846 | Stevens | Jan. 27, 1874 |
| 1,588,982 | Norton | June 15, 1926 |

FOREIGN PATENTS

| Number | Country | Date |
|---|---|---|
| 1,283,917 | Germany | Nov. 5, 1918 |

OTHER REFERENCES

Mechanical Engineer's Handbook, Marks, 3rd ed. 1930.
McGraw-Hill, page 555, page 1716.